US012237635B1

(12) United States Patent
Lin

(10) Patent No.: US 12,237,635 B1
(45) Date of Patent: Feb. 25, 2025

(54) CRIMPING PLIERS

(71) Applicant: Yueqing Shengbo Tools Co., Ltd., Wenzhou (CN)

(72) Inventor: Mao Lin, Wenzhou (CN)

( * ) Notice: Subject to any disclaimer, the term of this patent is extended or adjusted under 35 U.S.C. 154(b) by 0 days.

(21) Appl. No.: 18/679,969

(22) Filed: May 31, 2024

(30) Foreign Application Priority Data

Feb. 26, 2024 (CN) ........................ 202420347159.X

(51) Int. Cl.
*H01R 43/042* (2006.01)

(52) U.S. Cl.
CPC ...... *H01R 43/042* (2013.01); *Y10T 29/53226* (2015.01)

(58) Field of Classification Search
CPC .. H01R 43/042; H01R 43/048; H01R 43/058; Y10T 29/53222; Y10T 29/53226; Y10T 29/53235
See application file for complete search history.

(56) References Cited

U.S. PATENT DOCUMENTS

| | | | | |
|---|---|---|---|---|
| 3,383,963 | A * | 5/1968 | Vondrachek | B25B 7/04 81/177.85 |
| 4,199,972 | A * | 4/1980 | Wiener | B25B 7/00 81/419 |
| 4,283,933 | A * | 8/1981 | Wiener | B25B 7/12 81/419 |
| 5,884,540 | A * | 3/1999 | Mo | B25B 7/04 81/426 |
| 6,508,149 | B1 * | 1/2003 | Heggemann | B25B 27/146 81/320 |
| 9,543,725 | B2 * | 1/2017 | Li | H01R 43/042 |
| 2019/0319417 | A1 * | 10/2019 | Glockseisen | H01R 43/042 |
| 2020/0251869 | A1 * | 8/2020 | Weisheit | B25B 27/146 |
| 2021/0194198 | A1 * | 6/2021 | Weisheit | B25B 27/14 |
| 2021/0336399 | A1 * | 10/2021 | Glockseisen | B25B 27/146 |
| 2021/0336400 | A1 * | 10/2021 | Glockseisen | H01R 43/058 |
| 2022/0123514 | A1 * | 4/2022 | Glockseisen | H01R 43/042 |

* cited by examiner

*Primary Examiner* — Aneeta Yodichkas
*Assistant Examiner* — Joshua D Anderson
(74) *Attorney, Agent, or Firm* — Daniel M. Cohn; Howard M. Cohn

(57) ABSTRACT

A pair of crimping pliers is provided. The crimping pliers include a large handle, a small handle, a connecting rod, and a clamp fixing plate that form a hinged four-rod mechanism. Two ends of the connecting rod are connected between a rear part of the large handle and a rear part of the small handle. The clamp fixing plate is connected between a front part of the large handle and a front part of the small handle. A rear part of the connecting rod is bent and extends towards a tail end of the large handle, thereby extending a force arm. A first returning spring is connected between a back side of a bent part of the clamp fixing plate and the large handle. A pawl is rotatable and installed at the large handle. The pawl matches and meshes with outer pawl teeth of the clamp fixing plate.

2 Claims, 4 Drawing Sheets

CRIMPING PLIERS

TECHNICAL FIELD

The present disclosure relates to the technical field of crimping pliers, specifically to a pair of crimping pliers.

BACKGROUND

Crimping pliers are used for crimping joints or seal of aluminum or copper conductors in power electrical engineering. The crimping pliers mainly use pliers to tightly connect the joints or the seal. The pliers can be fixed or replaced, and the crimping pliers with replaceable pliers can adapt to different work scenarios by replacing different specifications and types of pliers. For example, Chinese utility model patent with the publication number of 201394812 discloses quick crimping pliers (i.e., quick wire stripper), which includes a static handle, a dynamic handle, and a gear propulsion framework. A spring ejector rod is installed on the static handle, upper and lower modules can be manually separated at any time during operation, and wires or wiring components to be connected can be removed from the modules to avoid material waste caused by operational errors. By adding the spring ejector rod, the operation is more flexible and convenient. However, the above-mentioned patent also has a complex structure.

SUMMARY

A purpose of the present disclosure is to provide a pair of crimping pliers to solve the problems proposed in the background mentioned above.

To achieve the above purpose, the present disclosure provides the following technical solution.

The crimping pliers are provided. The crimping pliers include a large handle (i.e., first handle), a small handle (i.e., second handle), a connecting rod, a clamp fixing plate, a first returning spring, a pawl, a second returning spring, mounting blocks, and plier beaks. The large handle, the small handle, the connecting rod, and the clamp fixing plate form a hinged four-rod mechanism. Two ends of the connecting rod are connected between a rear part of the large handle and a rear part of the small handle. The clamp fixing plate is connected between a front part of the large handle and a front part of the small handle. A front part of the clamp fixing plate is bent towards a side of the large handle and forms a clamp head with the front part of the large handle. The large handle includes two first plates that are opposite and separate from each other. The small handle includes two second plates that are opposite and separate from each other. A rear part of the connecting rod is bent and extends towards a tail end of the large handle. The first returning spring is connected between a back side of a bent part of the clamp fixing plate and the large handle. The pawl is rotatable and installed at the large handle. The pawl matches and meshes with outer pawl teeth at a root of the clamp fixing plate. A tail end of the pawl is connected to the second returning spring. An end of the second returning spring is connected to a rivet column on the large handle. The mounting blocks are rotatable and installed at two sides of the clamp head respectively. Inner sides of the mounting blocks are respectively provided with the plier beaks having an adjustable angle.

In an embodiment, an axial end of the pawl is provided with a knob that extends through the large handle.

In an embodiment, the crimping pliers further include connecting handles and ball-end screws. A back side of each of the plier beaks is provided with a corresponding one of the connecting handles having a cylindrical shape, and each of the connecting handles defines multiple positioning grooves along a circumference of the connecting handle. An inner side of each of the mounting blocks defines a hole matching with the corresponding connecting handle. A front end of each of the mounting blocks is screwed with corresponding two of the ball-end screws. A front end of each of the ball-end screws is inserted into a corresponding one of the multiple positioning grooves.

Compared with the related art, the present disclosure has the beneficial effects that the connecting rod of the present disclosure adopts an arc-shaped bending extension design, so that the compression elastic force is increased, and the operation is labor-saving. The plier beaks are positioned through the ball-end screws, so that the plier beaks can be conveniently and quickly disassembled and assembled, and can rotate to adjust a direction of the plier beaks to meet different use requirements.

DESCRIPTION OF REFERENCE NUMERALS

1—large handle; 2—small handle; 3—connecting rod; 4—clamp fixing plate; 5—first returning spring; 6—pawl; 7—second returning spring; 8—mounting block; 9—plier beak; 10—connecting handle; 11—ball-end screw; 12—first plate; 21—second plate; 70—rivet column; 80—hole; 101—positioning groove.

DETAILED DESCRIPTION OF EMBODIMENTS

The technical solutions in embodiments of the present disclosure will be clearly and completely described in the following with reference to drawings in the embodiments of the present disclosure. Apparently, the described embodiments are only a part of the embodiments, not all of the embodiments. Based on the embodiments of the present disclosure, all other embodiments obtained by those skilled in the art without creative work belong to a scope of protection of the present disclosure.

Figure 1:
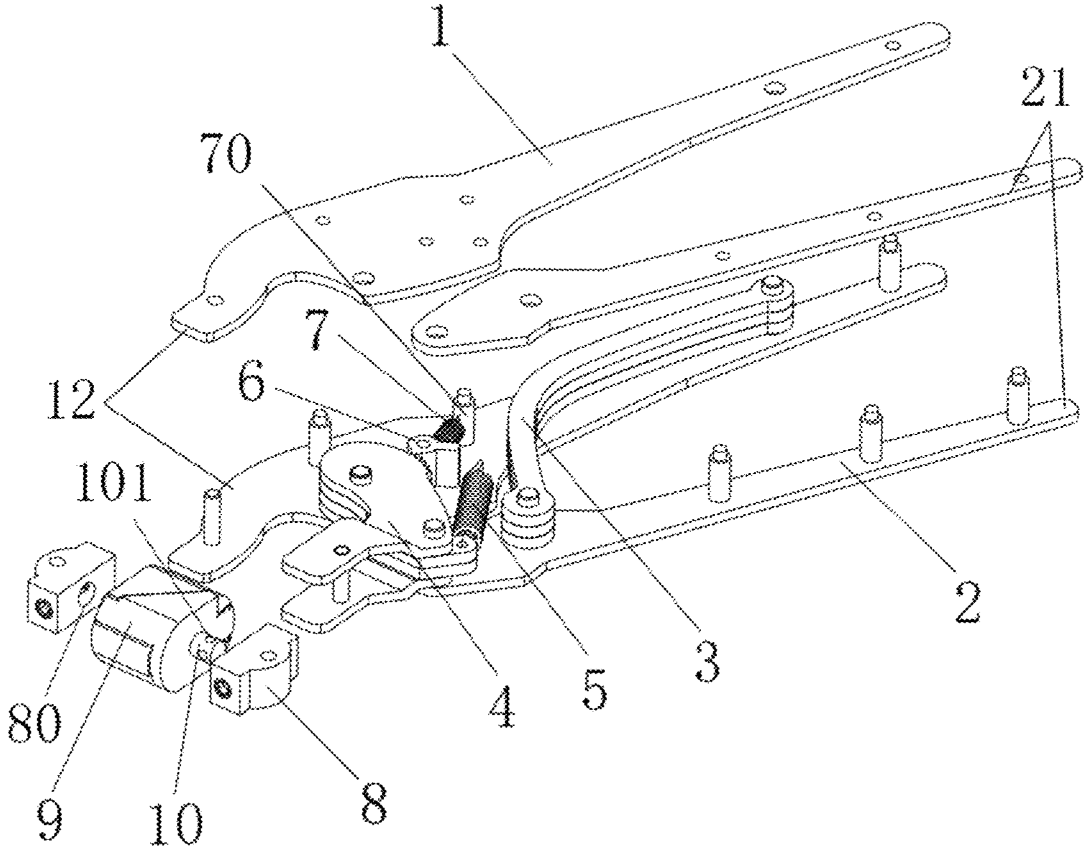
FIG. 1 illustrates an exploded structural schematic diagram of crimping pliers of the present disclosure.
Figure 2:
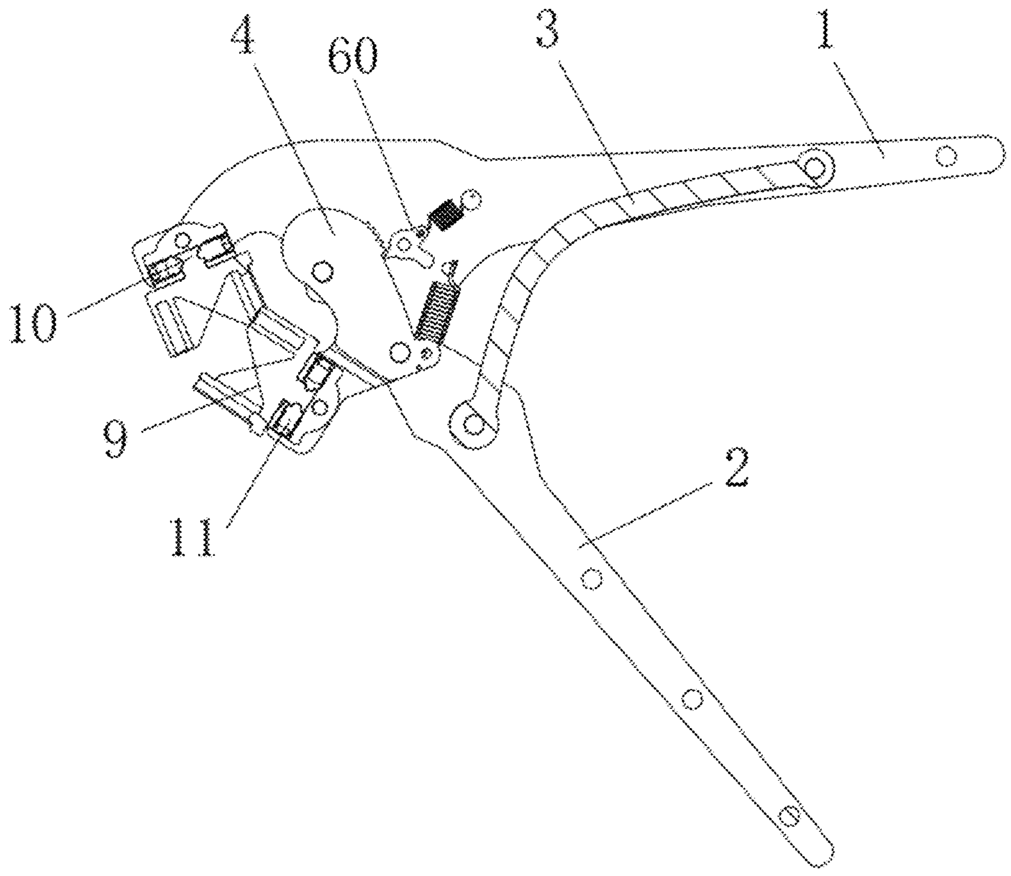
FIG. 2 illustrates a schematic diagram of the crimping pliers with plier beaks in an opened state.
Figure 3:
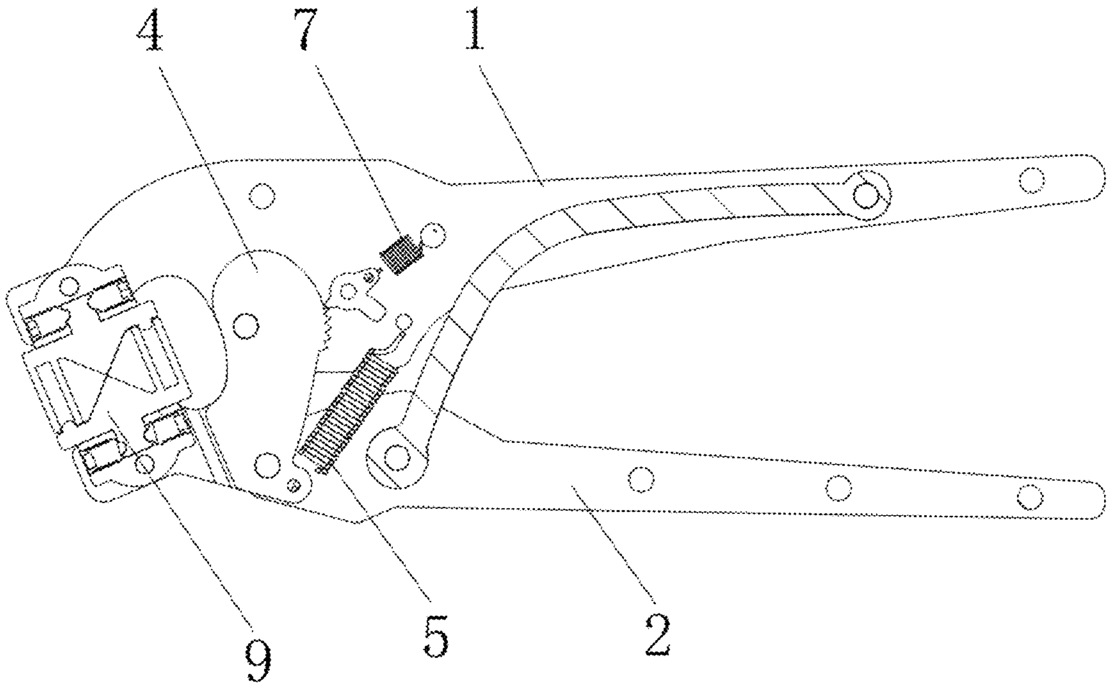
FIG. 3 illustrates a schematic diagram of the crimping pliers with the plier beaks in a closed state.
Figure 4:
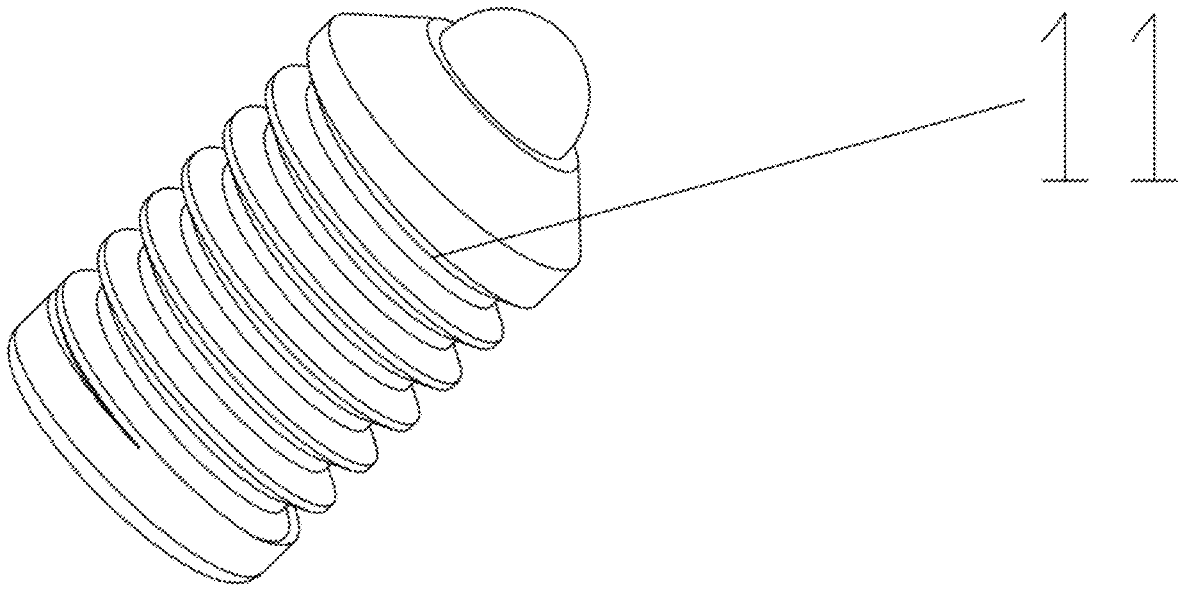
FIG. 4 illustrates a schematic diagram of a ball-end screw of the crimping pliers.

Referring to FIG. 1 to FIG. 3, the present disclosure provides the following technical solution. Crimping pliers include a large handle 1, a small handle 2, a connecting rod 3, a clamp fixing plate 4, a first returning spring 5, a pawl 6, a second returning spring 7, mounting blocks 8, and plier beaks 9. The large handle 1, the small handle 2, the connecting rod 3, and the clamp fixing plate 4 form a hinged four-rod mechanism. Two ends of the connecting rod 3 are connected between a rear part of the large handle 1 and a rear part of the small handle 2. The clamp fixing plate 4 is connected between a front part of the large handle 1 and a front part of the small handle 2. A front part of the clamp fixing plate 4 is bent towards a side of the large handle 1 and forms a clamp head with the front part of the large handle 1. The large handle 1 includes two first plates 12 that are opposite and separate from each other, and the two first plates 12 are fixedly connected to each other through rivet columns 70. The small handle 2 includes two second plates 21 that are opposite and separate from each other, and the two second plates 21 are fixedly connected to each other through rivet columns 70. A rear part of the connecting rod 3 is bent and extends towards a tail end of the large handle 1, this design is beneficial for increasing a compression force, increasing the force arm to make gripping and pressing operations of the crimping pliers more labor-saving, and a tail section of the connecting rod 3 can be hidden in the large handle 1. The first returning spring 5 is connected between a back side of a bent part of the clamp fixing plate 4 and the large handle 1. The first returning spring 5 is stretched when the clamp head is in a closed state, and the first returning spring 5 is configured to open and reset the plier beaks 9.

The pawl 6 is rotatable and installed at the large handle 1. The pawl 6 matches and meshes with outer pawl teeth at a root of the clamp fixing plate 4. An axial end of the pawl 6 is provided with a knob 60 that extends through the large handle 1. The knob 60 is configured to be moved to relieve the closed state of the clamp head. A tail end of the pawl 6 is connected to the second returning spring 7. An end of the second returning spring 7 is connected to a rivet column 70 on the large handle 1. The mounting blocks 8 are rotatable and installed at two sides of the clamp head respectively. Inner sides of the mounting blocks 8 are respectively provided with the plier beaks 9 having an adjustable angle. The two plier beaks 9 are relatively matched and occluded. The crimping pliers of the present disclosure further include connecting handles 10 and ball-end screws 11. A back side of each of the plier beaks 9 is provided with a corresponding one of the connecting handles 10 having a cylindrical shape, and each connecting handle 10 defines multiple positioning grooves 101 along a circumference of the connecting handle 10. An inner side of each of the mounting blocks 8 defines a hole 80 that matching with the corresponding connecting handle 10. A front end of each of the mounting blocks 8 is screwed with corresponding two of the ball-end screws 11. A front end of each of the ball-end screws 11 is inserted into a corresponding one of the multiple positioning grooves 101, and thus the plier beaks 9 can be quickly assembled and disassembled, making the plier beaks 9 easy to be replaced.

Although embodiments of the present disclosure have been shown and described, it can be understood by those skilled in the art that changes, modifications, replacements, and variations can be made to these embodiments without departing from principles and spirit of the present disclosure. The scope of the present disclosure is limited by the claims and their equivalents.

What is claimed is:

1. Crimping pliers, comprising: a first handle (1), a second handle (2), a connecting rod (3), a clamp fixing plate (4), a first returning spring (5), a pawl (6), a second returning spring (7), mounting blocks (8), and plier beaks (9);

wherein the first handle (1), the second handle (2), the connecting rod (3), and the clamp fixing plate (4) form a hinged four-rod mechanism; two ends of the connecting rod (3) are connected between a rear part of the first handle (1) and a rear part of the second handle (2); the clamp fixing plate (4) is connected between a front part of the first handle (1) and a front part of the second handle (2); a front part of the clamp fixing plate (4) is bent towards a side of the first handle (1) and forms a clamp head with the front part of the first handle (1); the first handle (1) comprises two first plates (12) that are opposite and separate from each other; the second handle (2) comprises two second plates (21) that are opposite and separate from each other; a rear part of the connecting rod (3) is bent and extends towards one end of the first handle (1) away from the pawl (6); the first returning spring (5) is connected between a back side of a bent part of the clamp fixing plate (4) and the first handle (1); the pawl (6) is rotatable and installed at the first handle (1); the pawl (6) matches and meshes with outer pawl teeth at a root of the clamp fixing plate (4); a tail end of the pawl (6) is connected to the second returning spring (7); an end of the second returning spring (7) is connected to a rivet column (70) on the first handle (1); the mounting blocks (8) are rotatable and installed at two sides of the clamp head respectively; and inner sides of the mounting blocks (8) are respectively provided with the plier beaks (9) having an adjustable angle;

wherein the crimping pliers further comprise connecting handles (10) and ball-head screws (11); wherein a back side of each of the plier beaks (9) is provided with a corresponding one of the connecting handles (10) having a cylindrical shape, and each of the connecting handles (10) defines a plurality of positioning grooves (101) along a circumference of the connecting handle (10); an inner side of each of the mounting blocks (8) defines a hole (80) matching with the corresponding connecting handle (10); a front end of each of the mounting blocks (8) is screwed with corresponding two of the ball-head screws (11); and a front end of each of the ball-head screws (11) is inserted into a corresponding one of the plurality of positioning grooves.

2. The crimping pliers as claimed in claim 1, wherein an axial end of the pawl (6) is provided with a knob (60) that extends through the first handle (1).

* * * * *